Figure 1:
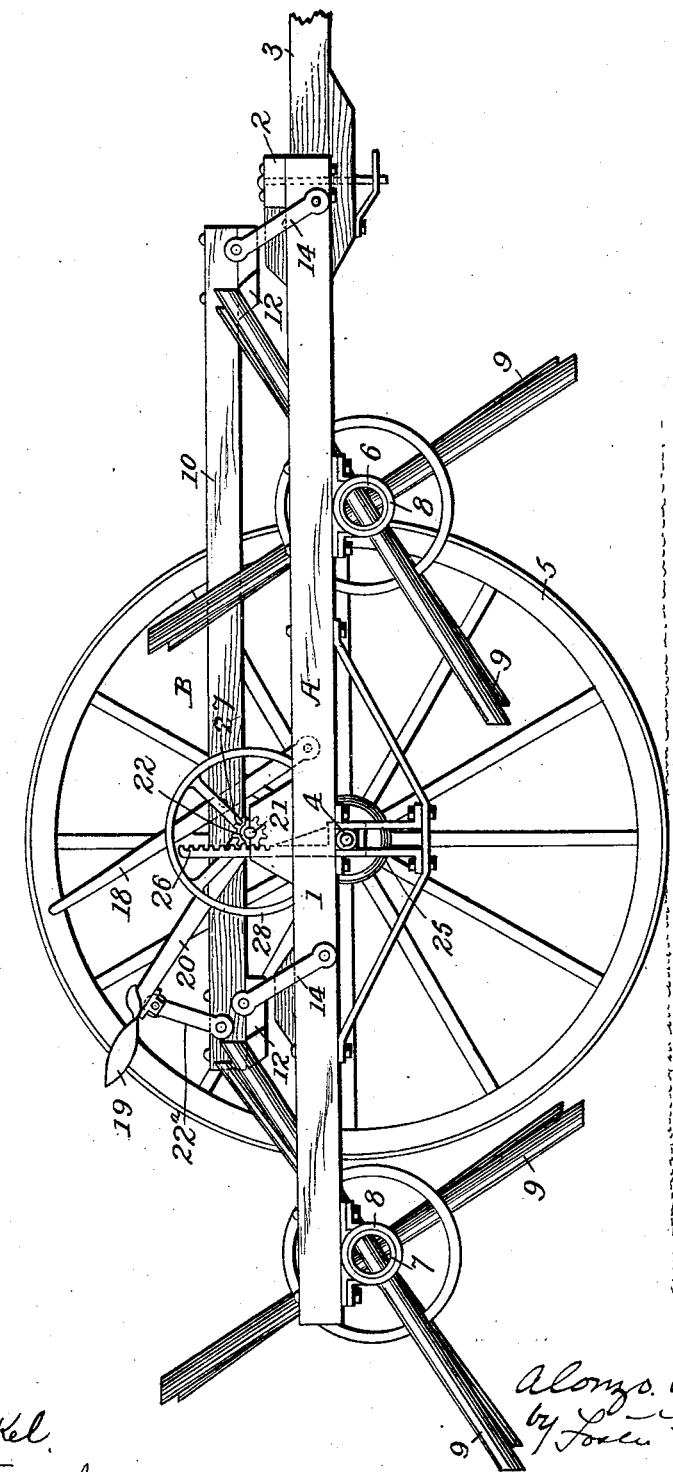

No. 633,209. Patented Sept. 19, 1899.
A. R. MUNSON.
VINE PULLING MACHINE.
(Application filed Mar. 29, 1899.)

(No Model.) 2 Sheets—Sheet 1.

Witnesses
J. G. Hinkel.
Philip Farnsworth

Inventor
Alonzo R. Munson
by Joen Freeman
Attorneys

THE NORRIS PETERS CO., PHOTO-LITHO., WASHINGTON, D. C.

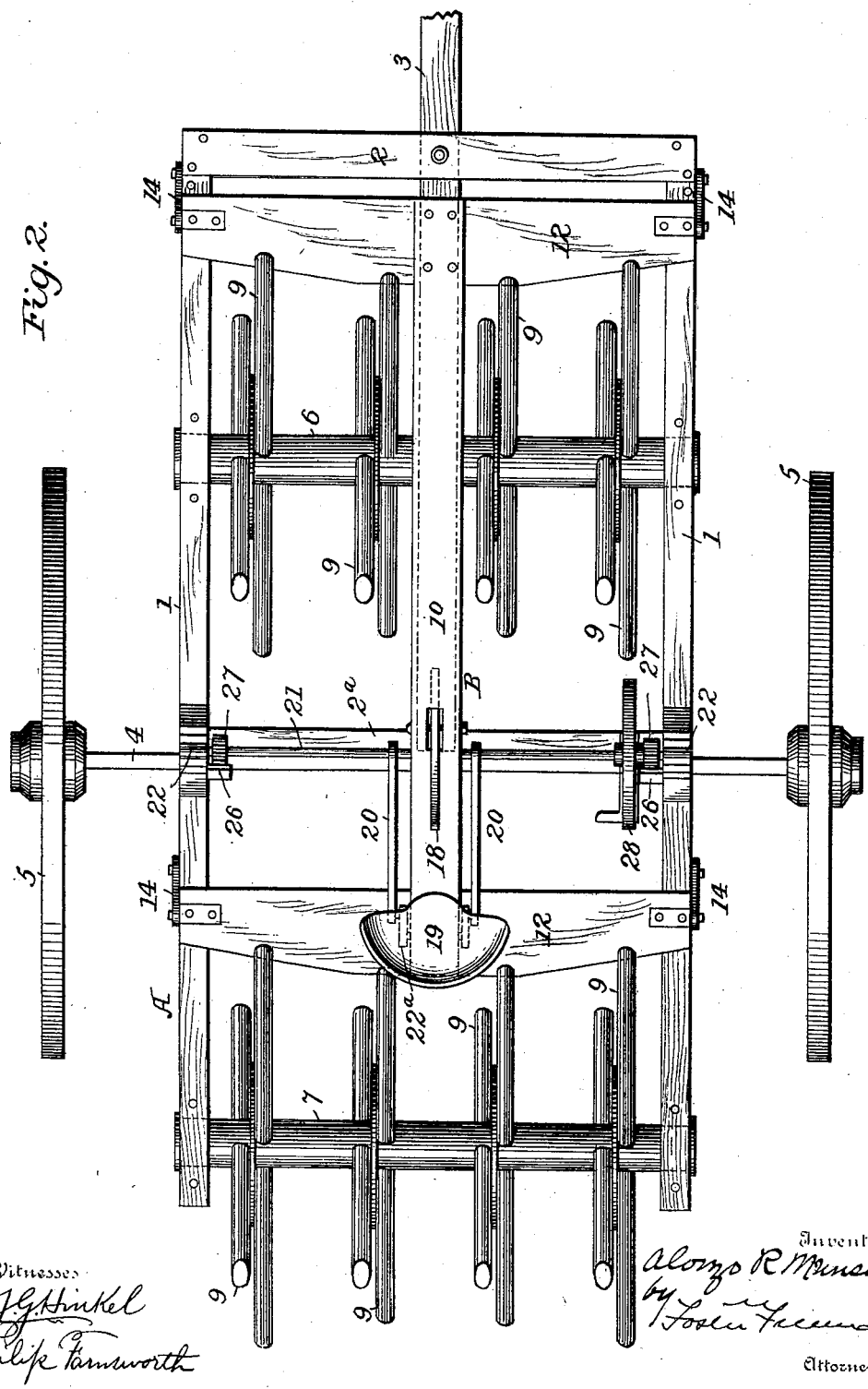

UNITED STATES PATENT OFFICE.

ALONZO R. MUNSON, OF NAPOLEONVILLE, LOUISIANA.

VINE-PULLING MACHINE.

SPECIFICATION forming part of Letters Patent No. 633,209, dated September 19, 1899.

Application filed March 29, 1899. Serial No. 710,988. (No model.)

*To all whom it may concern:*

Be it known that I, ALONZO R. MUNSON, a citizen of the United States, residing at Napoleonville, in the parish of Assumption and State of Louisiana, have invented certain new and useful Improvements in Vine-Pulling Machines, of which the following is a specification.

This invention relates to certain new and useful improvements in machines for pulling vines, and more especially pea-vines, from the earth and for depositing them in heaps upon the surface of the ground after their roots have been removed therefrom.

The invention has for its object to provide a machine which will effectively perform the above-described result and one which may be moved over the ground continuously without failure to pull all the vines in its path of movement.

With this object in view the invention consists in the novel features of construction and arrangement of the parts hereinafter more particularly described.

In the accompanying drawings, forming a part of this specification, and in which like letters and figures of reference designate corresponding parts, Figure 1 is a side elevation of a machine embodying the invention, and Fig. 2 is a top plan view thereof.

Referring more particularly to the drawings, A designates the main frame of the machine, comprising parallel side bars 1, connected together at their forward ends and near their centers by cross-bars 2 2ª. Extending centrally between the side bars and projecting beyond the main frame is a tongue 3, which is suitably connected to the front cross-bar 2 and to center cross-bar 2ª. The frame A is mounted in the present instance upon the axle 4 of a pair of supporting-wheels 5, although it will be understood that when practicable and desirable four wheels may be employed, and the said frame is so arranged that it may be adjusted vertically for the purpose and by the means which will be hereinafter described.

Extending transversely across from one side bar of the frame A to the other and arranged near the front and rear ends thereof, respectively, are two pulling-finger shafts 6 7, the said shafts being mounted to rotate freely in journals or bearings 8 of the frame and one being preferably arranged in advance of the traction-wheels and the other in the rear thereof, and while these shafts may be formed solid in the interest of lightness and strength it has been found desirable to form them tubular, as shown. Each end of shaft 6 7 has a collar on each side of bearing 8 to hold the frame in position, and likewise the frame holds them. Radiating from each of the shafts 6 7 at equidistant points around their circumferences are series or rows of pulling-fingers 9, each row extending from one end of its shaft to the other and the fingers thereof being separated. The ends of these fingers are adapted to engage with the vines which lie close to the ground and pull them up by the roots. The fingers 9 may be constructed in any suitable manner and formed of any desired material. As shown, however, they are tubular in cross-section, and it is preferred to form them in this way. When the machine is to be used for pulling vines growing upon level ground, the pulling-fingers are of uniform length; but in most instances, especially in the case of pea-vines, the vines are planted on the top or upon the sides of parallel rows of earth, between which are furrows, and in order that each finger of a row may be brought to a uniform distance from the earth they are formed unequal in length. The machine illustrated in the drawings is adapted to pull vines from a single row of earth, and in order that the pulling-fingers may conform substantially to the contour thereof the fingers intermediate the end ones are the shortest, as shown, the longer or end fingers being adapted to extend down into the furrows upon each side of a row.

The rows of pulling-fingers 9 of each of the shafts 6 7 are brought successively into operative position, and in order that the necessary pulling effect may be exerted upon the vines with which they come into contact suitable mechanism is provided for arresting the rotation of the shafts 6 and 7 and holding the rows of pulling-fingers stationary, such mechanism being under the control of the operator to release the fingers at predetermined intervals to the end that the shafts 6 7 and their fingers may be rotated by the weight or resistance of vines collected by one row of pulling-fingers to bring the next succeeding row into operative position.

While various devices may be employed for controlling the action of the pulling-fingers and their shafts, the means which will now be described is simple and has been found effective in practice and is preferred for this reason.

Above the main frame A is what will hereinafter be termed a "trip-frame" B, comprising a center bar 10, arranged above the tongue 3 of the main frame, and at each end the said center bar is connected by transverse trip-bars 12, adapted to be engaged by the ends of the rows of pulling-fingers and hold said fingers and their shafts against rotation. The trip-frame B normally rests upon the cross-bars of the main frame A, but is movable with relation thereto to carry the trip-bars out of engagement with the pulling-fingers 9, this being permitted by connecting the opposite ends of the trip-frame to the main frame by means of links 14, the ends of said links being pivoted to the side bars of the main and trip frames. By this arrangement the trip-frame may be shifted longitudinally of the main frame and the trip-bars removed from beneath the ends of pulling-fingers. As a convenient means of shifting the trip-frame B a lever 18 is provided, which lever is pivoted at its lower end to the main frame and intermediate its ends to the center bar of the trip-frame, the upper end of the operating-lever extending into position to be conveniently grasped by the driver or operator. A seat 19 is provided and supported upon the upper ends of parallel bars 20, pivoted at their lower ends to a shaft 21, extending transversely across the main frame and having its ends journaled in bearings 22 of the opposite side bars thereof. At their upper ends the bars 20 are pivotally connected to the upper ends of links 22ª, the lower ends of which bear upon and are pivotally secured to the center bar 10. By thus supporting the seat it is permitted to shift its position whenever the trip-frame is moved.

Projecting from the lower faces of the side frame-bars 1 are slotted guides 25, through the slots of which projects the axle 4. This axle is preferably rectangular in cross-section and opposite sides thereof conform closely to the edges of the slots. Fixedly connected to the axle 4 near the opposite ends thereof and projecting vertically therefrom are rack-bars 26, with the teeth of which mesh pinions 27, mounted upon the shaft 21. Likewise mounted upon the shaft 21 is a hand-wheel 28, by means of which the shaft and pinions may be rotated, and by reason of the engagement of the pinions with the stationary rack-bars the main and trip frames may be raised or lowered, as desired, to bring the points of the pulling-teeth to the desired positions relative to the ground. A suitable brake device is provided for holding the hand-wheel and, in consequence, the main frame in any position to which they are adjusted.

Briefly stated, the operation of the machine is as follows: It is drawn over a field by suitable power, the wheels of its truck running in the furrows and a row of pulling-teeth of each pulling shaft or frame being in close proximity to the ground and held stationary by the locking and releasing mechanism or trip-frame. The pulling-fingers coming into engagement with the vines pulls them from the ground by their roots and carries them along with the machine. When a sufficient quantity of vines has been collected by the two rows of fingers, the operator by shifting the lever 18 actuates the trip-frame, and the ends of the two rows of pulling-fingers which are in engagement with the trip-bars are released. Then by the pulling effect or weight of the collected vines upon the previously-operative rows of fingers both pulling-shafts are rotated to discharge the vines upon them and at the same time bring two new rows of pulling-teeth into operative position, after which the trip-frame is shifted rearwardly, and the trip-bars thereof coming into engagement with two rows of pulling-teeth hold the pulling-shafts stationary until the trip-frame is again shifted.

It will be understood, of course, that by providing two pulling shafts or frames and arranging them one in advance of the other the progress of the machine need not be arrested each time it is desired to discharge a mass of collected vines, since the vines missed by the forward pulling-fingers during the rotation thereof will be collected by the rear fingers before the machine passes over them. Therefore it is unnecessary to draw the machine over the ground a second time, as is often the case with machines now on the market.

The peculiar construction of my machine enables it to pull pea-vines among cornstalks without pulling up as many stalks, and consequently without so much dirt, as other pullers do.

Without limiting myself to the exact construction and arrangement of the parts shown and described, since it will be obvious that various changes in such construction and arrangement may be made without departing from the spirit or scope of my invention, what I claim is—

1. In a vine-pulling machine, the combination of a truck, a vertically-adjustable frame mounted thereon, and two rows or series of pulling-fingers, one arranged in advance of the other, carried by the frame, substantially as described.

2. In a vine-pulling machine, the combination of a truck, a vertically-adjustable frame mounted thereon, and two rows or series of pulling-fingers, one arranged in advance of the other, carried by the frame, the fingers of each row or series being of varying lengths, substantially as described.

3. In a vine-pulling machine, the combination of a truck and its supporting-wheels, a frame mounted thereon, a freely-rotatable shaft carried upon the frame having series of rows of pulling-fingers radiating therefrom and arranged at equidistant points around its circumference, and means for holding the shaft against and for permitting the rotation thereof, substantially as described.

4. In a vine-pulling machine, the combination of a truck, a main frame mounted thereon, a rotatable shaft journaled in the frame and having a series of rows of pulling-fingers radiating therefrom, and a reciprocating trip-frame upon the main frame having trip-bars adapted to engage the pulling-fingers to prevent the rotation thereof, and means for reciprocating the trip-frame to carry the trip-bars out of engagement with the pulling-fingers, substantially as described.

5. In a vine-pulling machine, the combination of a wheeled truck, a vertically-reciprocating frame mounted thereon, a plurality of shafts journaled in the frame, one in advance of the other, a series of rows of pulling-fingers arranged at equidistant points around the circumference of each shaft and radiating therefrom, and means for holding the shafts against and for permitting the simultaneous rotation thereof, substantially as described.

In testimony whereof I have signed my name to this specification in the presence of two subscribing witnesses.

ALONZO R. MUNSON.

Witnesses:
EUG. E. CHAUVIN,
ABNER A. FOLSE.